US011170210B2

United States Patent
Wang et al.

(10) Patent No.: US 11,170,210 B2
(45) Date of Patent: Nov. 9, 2021

(54) GESTURE IDENTIFICATION, CONTROL, AND NEURAL NETWORK TRAINING METHODS AND APPARATUSES, AND ELECTRONIC DEVICES

(71) Applicant: Beijing SenseTime Technology Development Co., Ltd., Beijing (CN)

(72) Inventors: Quan Wang, Beijing (CN); Wentao Liu, Beijing (CN); Chen Qian, Beijing (CN)

(73) Assignee: Beijing SenseTime Technology Development Co., Ltd., Beijing (CN)

( * ) Notice: Subject to any disclaimer, the term of this patent is extended or adjusted under 35 U.S.C. 154(b) by 225 days.

(21) Appl. No.: 16/587,001

(22) Filed: Sep. 29, 2019

(65) Prior Publication Data

US 2020/0026910 A1 Jan. 23, 2020

Related U.S. Application Data

(63) Continuation of application No. PCT/CN2018/081130, filed on Mar. 29, 2018.

(30) Foreign Application Priority Data

Mar. 31, 2017 (CN) .......................... 201710208528.1

(51) Int. Cl.
*G06K 9/00* (2006.01)
*G06K 9/62* (2006.01)
(Continued)

(52) U.S. Cl.
CPC ....... *G06K 9/00355* (2013.01); *G06K 9/6256* (2013.01); *G06N 3/0454* (2013.01); *G06N 3/08* (2013.01); *G06K 2209/21* (2013.01)

(58) Field of Classification Search
CPC ............. G06K 9/00355; G06K 9/6256; G06K 2209/21; G06K 9/3233; G06K 9/4628;
(Continued)

(56) References Cited

U.S. PATENT DOCUMENTS

| 2018/0075659 | A1* | 3/2018 | Browy ................. G06F 1/1686 |
| 2019/0236344 | A1* | 8/2019 | Chen .................. G06K 9/00355 |
| 2020/0143154 | A1* | 5/2020 | Ette ........................... G06T 7/13 |

FOREIGN PATENT DOCUMENTS

| CN | 103903011 A | 7/2014 |
| CN | 104038799 A | 9/2014 |

(Continued)

OTHER PUBLICATIONS

International Search Report in the international application No. PCT/CN2018/081130, dated Jul. 4, 2018.
(Continued)

*Primary Examiner* — Charlotte M Baker
(74) *Attorney, Agent, or Firm* — Syncoda LLC; Feng Ma

(57) ABSTRACT

A gesture identification method includes: performing gesture information detection on an image by means of a neural network, to obtain a potential hand region, a potential gesture category and a potential gesture category probability in the image, the potential gesture category including a gesture-free category and at least one gesture category; and if the obtained potential gesture category with the maximum probability is the gesture-free category, not outputting position information of the potential hand region of the image; or otherwise, outputting the position information of the potential hand region of the image and the obtained potential gesture category with the maximum probability.

20 Claims, 13 Drawing Sheets

(51) Int. Cl.
*G06N 3/04* (2006.01)
*G06N 3/08* (2006.01)

(58) Field of Classification Search
CPC .. G06K 9/627; G06K 9/00382; G06N 3/0454; G06N 3/08; G06N 3/084; G06N 3/0481; G06N 3/082
USPC ......................................................... 382/104
See application file for complete search history.

(56) References Cited

FOREIGN PATENT DOCUMENTS

| | | |
|---|---|---|
| CN | 104834922 A | 8/2015 |
| CN | 105373785 A | 3/2016 |
| CN | 105718878 A | 6/2016 |

OTHER PUBLICATIONS

English translation of the Written Opinion of the International Search Authority in the international application No. PCT/CN2018/081130, dated Jul. 4, 2018.
Hand Posture Recognition Method Based on Depth Image Technoloy. 2012, 38(08): 16-18.
A Computer Vision-Based Gesture Detection And Recognition Technique. 2013, 30(1): 155-160.
Qian C, Sun X, Wei Y, et al. Realtime and robust hand tracking from depth[C]//Proceedings of the IEEE Conference on Computer Vision and Pattern Recognition. 2014: 1106-1113.
Ren S, He K, Girshick R, et al. Faster r-cnn: Towards real-time object detection with region proposal networks[J].arXiv preprint arXiv:1506.01497, 2015.
Krizhevsky A, Sutskever I, Hinton G E. Imagenet classification with deep convolutional neural networks[C]//Advances in neural information processing systems. 2012: 1097-1105.

* cited by examiner

GESTURE IDENTIFICATION, CONTROL, AND NEURAL NETWORK TRAINING METHODS AND APPARATUSES, AND ELECTRONIC DEVICES

CROSS-REFERENCE TO RELATED APPLICATIONS

The present application is a continuation of International Application No. PCT/CN2018/081130 filed on Mar. 29, 2018, which claims priority to Chinese Patent Application No. 201710208528.1 filed on 31 Mar. 2017. The disclosures of these applications are hereby incorporated by reference in their entirety.

BACKGROUND

With the development of computer visual technologies, many new man-machine interaction techniques have appeared. Naturally, controlling a machine using a gesture has the best application value; meanwhile, using an RGB camera as an interaction medium is a remote interaction mode that would be most easily popularized. RGB image-based gesture interaction provides a remote and non-contact real-time man-machine interaction mode, which functions as conventional contact interactive input devices such as a mouse, a keyboard, a remote-control, and a touch screen to a certain extent.

However, during the process of man-machine interaction using a gesture, gesture identification is required.

SUMMARY

Embodiments of the present disclosure relate to an artificial intelligence technology, and in particular, to gesture identification methods and apparatuses and electronic devices; gesture control methods and apparatuses and electronic devices; and neural network training methods and apparatuses and electronic devices.

Embodiments of the present disclosure provide technical solutions of gesture identification, gesture control and neural network training.

According to an aspect of the embodiments of the present disclosure, a gesture identification method is provided, including: performing gesture information detection on an image by means of a neural network, to obtain a potential hand region, a potential gesture category and a potential gesture category probability in the image, the potential gesture category comprising a gesture-free category and at least one gesture category; and if the obtained potential gesture category with the maximum probability is the gesture-free category, not outputting position information of the potential hand region of the image; or otherwise, outputting the position information of the potential hand region of the image and the obtained potential gesture category with the maximum probability.

According to another aspect of the embodiments of the present disclosure, a gesture control method is provided, including: performing gesture identification on a current video frame in a video frame sequence using the method according to any one of the embodiments above of the present disclosure, to obtain position information of a hand region of the current video frame and a gesture category; and executing a corresponding control operation at least according to the position information of the hand region of the current video frame and/or the gesture category.

According to another aspect of the embodiments of the present disclosure, a neural network training method is provided, including: obtaining a training sample image annotated with gesture information; scrambling the training sample image; and training the neural network based on a training sample set constituted by the training sample image and the scrambled training sample image.

According to a further aspect of the embodiments of the present disclosure, a gesture identification apparatus is provided, including: a detection module, configured to perform gesture information detection on an image by means of a neural network, to obtain a potential hand region, a potential gesture category and a potential gesture category probability in the image, the potential gesture category comprising a gesture-free category and at least one gesture category; and an output module, configured not to output, if the obtained potential gesture category with the maximum probability is the gesture-free category, position information of the potential hand region of the image; or output the position information of the potential hand region of the image and the obtained potential gesture category with the maximum probability.

According to a further aspect of the embodiments of the present disclosure, a gesture identification apparatus is provided, including: a memory storing processor-executable instructions; and a processor arranged to execute the stored processor-executable instructions to perform steps of: performing gesture information detection on an image by means of a neural network, to obtain a potential hand region, a potential gesture category and a potential gesture category probability in the image, the potential gesture category comprising a gesture-free category and at least one gesture category; and if the obtained potential gesture category with the maximum probability is the gesture-free category, not outputting position information of the potential hand region of the image; or otherwise, outputting the position information of the potential hand region of the image and the obtained potential gesture category with the maximum probability.

According to a further aspect of the embodiments of the present disclosure, a gesture control apparatus is provided, including: an identification module, configured to perform gesture identification on a current video frame in a video frame sequence using the gesture identification method or apparatus according to any one of the embodiments above of the present disclosure, to obtain position information of a hand region of the current video frame and a gesture category; and a control module, configured to execute a corresponding control operation at least according to the position information of the hand region of the current video frame and/or the gesture category.

According to a further aspect of the embodiments of the present disclosure, a neural network training apparatus is provided, including: a sample obtaining module, configured to obtain a training sample image annotated with gesture information; a sample scrambling module, configured to scramble the training sample image; and a neural network training module, configured to train the neural network based on a training sample set constituted by the training sample image and the scrambled training sample image.

According to a further aspect of the embodiments of the present disclosure, an electronic device is provided, including: a processor and a memory, where the memory is configured to store at least one executable instruction enabling the processor to execute an operation corresponding to the gesture identification method according to any one of the embodiments above of the present disclosure, or to execute an operation corresponding to the gesture control method according to any one of the embodiments above of the present disclosure, or to execute an operation corresponding to the neural network training method according to any one of the embodiments above of the present disclosure.

According to a further aspect of the embodiments of the present disclosure, a non-transitory computer readable storage medium is further provided. The medium have stored thereon computer-readable instructions that, when executed by a processor, cause the processor to implement a gesture identification method, the method including: performing gesture information detection on an image by means of a neural network, to obtain a potential hand region, a potential gesture category and a potential gesture category probability in the image, the potential gesture category comprising a gesture-free category and at least one gesture category; and if the obtained potential gesture category with a maximum probability is the gesture-free category, not outputting position information of the potential hand region of the image; or otherwise, outputting the position information of the potential hand region of the image and the obtained potential gesture category with the maximum probability.

According to a further aspect of the embodiments of the present disclosure, a computer program is further provided, including a computer readable code, where when the computer readable code is operated on a device, a processor in the device executes an instruction for implementing each step in the gesture identification method according to any one of the embodiments above of the present disclosure, or executes an instruction for implementing each step in the gesture control method according to any one of the embodiments above of the present disclosure, or executes an instruction for implementing each step in the neural network training method according to any one of the embodiments above of the present disclosure.

The following further describes in detail the technical solutions of the present disclosure with reference to the accompanying drawings and embodiments.

BRIEF DESCRIPTION OF DRAWINGS

The accompanying drawings constituting a part of the specification describe the embodiments of the present disclosure and are intended to explain the principles of the present disclosure together with the descriptions. According to the following detailed descriptions, the present disclosure may be understood more clearly with reference to the accompanying drawings.

DETAILED DESCRIPTION

Figure 1:
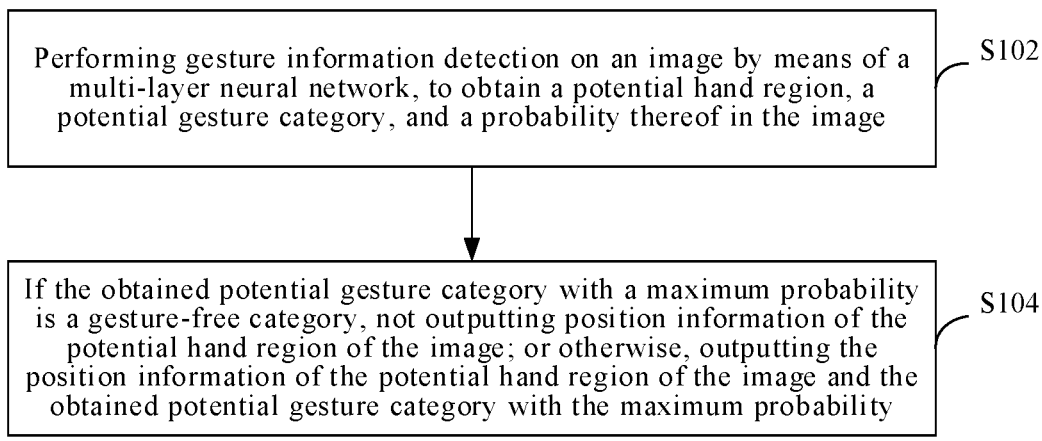
FIG. 1 is a flowchart of a gesture identification method according to an embodiment of the present disclosure.

The implementations of the embodiments of the present disclosure are further described in detail below with reference to the accompanying drawings (the same reference numerals in a plurality of accompanying drawings represent the same elements) and the embodiments. The following embodiments are intended to illustrate the present disclosure, but are not intended to limit the scope of the present disclosure. It should be noted that, unless otherwise stated specifically, relative arrangement of the components and steps, the numerical expressions, and the values set forth in the embodiments are not intended to limit the scope of the present disclosure.

A person skilled in the art may understand that the terms such as "first" and "second" in the embodiments of the present disclosure are only used to distinguish different steps, devices or modules, etc., and do not represent any specific technical meaning or an inevitable logical sequence therebetween.

Technologies, methods and devices known to a person of ordinary skill in the related art may not be discussed in detail, but such technologies, methods and devices should be considered as a part of the specification in appropriate situations.

It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to electronic devices such as terminal devices, computer systems, and servers, which may operate with numerous other general-purpose or special-purpose computing system environments or configurations. Examples of well-known terminal devices, computing systems, environments, and/or configurations suitable for use together with the electronic devices such as terminal devices, computer systems, and servers include, but are not limited to, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic devices such as terminal devices, computer systems, and servers may be described in the general context of computer system executable instructions (for example, program modules) executed by the computer system. Generally, the program modules may include routines, programs, target programs, components, logics, data structures, and the like for performing specific tasks or implementing specific abstract data types. The computer system/server may be practiced in the distributed cloud computing environments in which tasks are performed by remote processing devices that are linked through a communications network. In the distributed computing environments, the program modules may be located in local or remote computing system storage media including storage devices. With reference to FIG. 1, a flowchart of a gesture identification method according to an embodiment of the present disclosure is shown. The gesture identification method in this embodiment includes the following steps.

At Step S102, the gesture information detection is performed on the image by means of the neural network, to obtain the potential hand region, the potential gesture category and the potential gesture category probability in the image.

The potential gesture category may include: a gesture-free category and at least one gesture category. The gesture category in the embodiments of the present disclosure may be set by a person skilled in the art according to actual requirements, for example, an OK hand, a peach heart hand, a V-shaped hand, etc.

The neural network in the embodiments of the present disclosure includes multiple layers of neural networks, may be a properly trained neural network, including, but not limited to a trained convolutional neural network; the image may be a video frame image in the video sequence and may also be a static image. Generally speaking, the image may often be a color image, including but not limited to an RGB image; the color image may be generated by photographing using any proper device such as a camera or a web camera.

Information of the potential hand region, the potential gesture category and the potential gesture category probability in the detected image can be obtained by means of the neural network in the embodiments of the present disclosure.

A region that is most like a hand, i.e., the potential hand region, is selected from the image by means of the neural network; the region may be outlined using a rectangular box and may also be shown in other shapes. For each image (no matter whether a hand exists in the image), the neural network would automatically detect a region that is most like a hand, and performs gesture identification in the region, i.e., determining whether a hand exists in the region or which type the gesture belongs. During detecting or identifying the potential hand region, the neural network does not need a full image detection, but only needs to detect the potential hand region, which is the region which is most likely to be a hand in the image; the detection and identification results would also be more accurate.

In an optional example, the step S102 is performed by a processor by invoking a corresponding instruction stored in a memory, or is performed by a detection module 702 run by the processor.

At Step S104, if the obtained potential gesture category with the maximum probability is the gesture-free category, position information of the potential hand region of the image is not output; or the position information of the potential hand region of the image and the obtained potential gesture category with the maximum probability are output.

The gesture-free category is used as a type of gesture possible categories, determination is made according to the probability that the potential hand region belongs to each potential gesture category and the gesture category corresponding to the maximum probability is determined as a final gesture category.

When the potential gesture category is the gesture-free category, it indicates that no hand exists in the image. Hence, the position information of the potential hand region is not required to be output.

In an optional example, step S104 is performed by a processor by invoking a corresponding instruction stored in a memory, or is performed by an output module 704 run by the processor.

According to this embodiment, gesture information detection is performed on the image by means of the neural network to obtain the potential hand region, the potential gesture category and the potential gesture category probability in the image; furthermore, the potential gesture category with the maximum probability is determined from the obtained information above; if the potential gesture category is the gesture-free category, it can be determined that no hand exists in the image, and relative information does not need to be output; or the relative information of the gesture is output according to the probability that the potential hand region belongs to each potential gesture category, including the position information of the potential hand region where the gesture is located and the information of the potential gesture category. By means of the solution of this embodiment, the region that is most like the hand is determined, and a gesture identification range is reduced, so that not only gesture identification can be implemented, but also the position and category of the gesture included in the region which is most like the hand are determined using the maximum probability of the potential gesture category as a basis, so that more accurate gesture identification is implemented, and in the follow-up man-machine interaction process, accurate control and operation of a machine device by means of a gesture are implemented.

Figure 2:
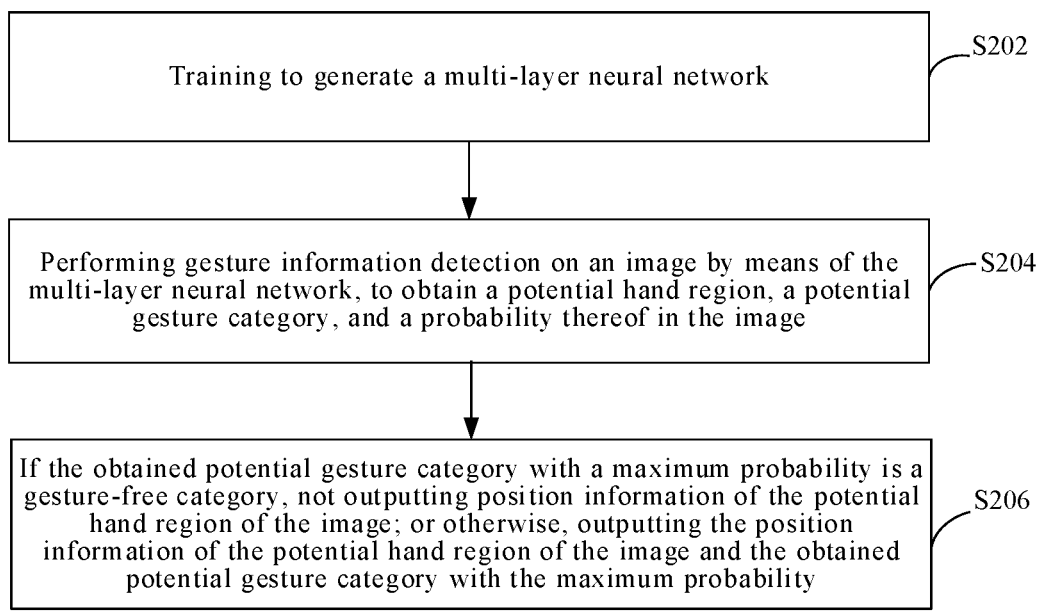
FIG. 2 is a flowchart of a gesture identification method according to another embodiment of the present disclosure.

With reference to FIG. 2, a flowchart of a gesture identification method according to another embodiment of the present disclosure is shown. In this embodiment, the neural network used for gesture identification can be generated first by means of training before executing gesture identification, and a neural network provided by a third party may also be used. The neural network generated by means of training is taken as an example in this embodiment for explanation. The gesture identification method in this embodiment includes the following steps.

At Step S202, a neural network is generated by means of training.

In some embodiments, the step S202 may include: obtaining a training sample image annotated with gesture information; scrambling the training sample image; and training the neural network based on a training sample set constituted by the training sample image and the scrambled training sample image.

The annotation for the gesture information in the training sample image can be determined by a person skilled in the art according to actual requirements, for example, it may include, but not limited to, any one or more of: the gesture-free, gesture-contained, gesture category, other gesture categories, hand region position, and other annotation information. Scrambling the training sample image may also be implemented by a person skilled in the art by means of a proper mode according to actual requirements, for example, it may include, but not limited to, any one or more of: translation processing, scaling processing, mirroring processing, etc. Scrambling may expand the training sample images to prevent overfitting. When the number of the training sample images is small, a condition of fitting of the convolutional neural networks may appear, which does not facilitate the accuracy for training and detection of the neural network, and therefore, when the training sample images are a few, the training sample images are expanded by scrambling.

In an implementation, the neural network includes a first neural network and a second neural network multiplexing a network input layer and a partial convolutional layer; in another implementation, in addition to that the neural network includes the first neural network and the second neural network multiplexing the network input layer and the partial convolutional layer, the second neural network includes a first sub-neural network and a second sub-neural network multiplexing the network input layer and the partial convolutional layer.

Accordingly, when training the neural network based on the training sample set constituted by the training sample image and the scrambled training sample image, an implementation includes: training the first neural network based on a positive sample in the training sample set; and after training the first neural network is completed, fixing a network parameter of the multiplexed network input layer and partial convolutional layer and training the second neural network based on the positive sample and a negative sample in the training sample set. The first neural network is trained using the positive sample; upon the first neural network is trained, the first neural network may be forced to find a potential hand region in each image, no matter whether a hand exists in the image. In this way, the image region required to be identified is reduced. Moreover, the second neural network is trained based on the positive and negative samples, no-hand is used as a type of gestures by means of the negative sample, and there is no need to separately determine whether a hand exists in the image.

Another implementation includes: training the first neural network based on the positive sample in the training sample set; after training the first neural network is completed, fixing a network parameter of the multiplexed network input layer and partial convolutional layer and training the first sub-neural network and the second sub-neural network based on the positive sample and the negative sample in the training sample set. In this mode, the first sub-neural network determines whether a hand exists, and directly returns back to the potential hand region if no hand exists without outputting, and the second sub-neural network further determines which gesture it is. In this way, the numbers of each category of training samples in the first and second sub-neural networks are basically consistent, and a phenomenon that a certain category is well trained but other effects are bad would not occur, for example, the numbers of hand-contained and no-hand samples are basically the same, the number of samples of the gesture in each category is similar, and it would make the training of the samples of many different gestures be similar to that of the no-hand samples. Implementing details for training to generate the neural network may exemplarily refer to relative descriptions of FIGS. 5 and 6 in the embodiments of the present disclosure.

In an optional example, step S202 may be performed by a processor by invoking a corresponding instruction stored in a memory, and may also be performed by a training module 810 run by the processor.

At Step S204, the gesture information detection is performed on the image by means of the neural network, to obtain the potential hand region, the potential gesture category and the potential gesture category probability in the image.

When the neural network includes a first neural network and a second neural network multiplexing a network input layer and a partial convolutional layer, the step can be implemented as: detecting the potential hand region in the image by means of the first neural network and detecting the potential gesture category and the potential gesture category probability in the image by means of the second neural network.

The potential gesture category includes: a gesture-free category and at least one gesture category. Furthermore, the at least one gesture category includes: at least one gesture category, for example, may include, but not limited to, any one or more of: a flat propping hand, thumbs-up, a pistol hand, an OK hand, a peach heart hand, a V-shaped hand, and a five-finger splaying hand. Or the at least one gesture category includes: at least one predetermined gesture category and other gesture categories that do not belong to the predetermined gesture category.

In another implementation, the potential gesture category may also include a first potential gesture category and a second potential gesture category. The first potential gesture category includes: a gesture-contained category and a gesture-free category; and the second potential gesture category includes: at least two predetermined gesture categories or at least one predetermined gesture category and other gesture categories that do not belong to the predetermined gesture category. Under this condition, when the second neural network includes a first sub-neural network and a second sub-neural network multiplexing the network input layer and the partial convolutional layer, the performing the gesture information detection on the image by means of the neural network, to obtain the potential hand region, the potential gesture category and the potential gesture category probability in the image includes: detecting the potential hand region in the image by means of the first neural network; detecting the first potential gesture category and the potential gesture category probability in the image by means of the first sub-neural network; and detecting the second potential gesture category and the potential gesture category probability in the image by means of the second sub-neural network.

In addition, when the current image is the video frame image in the video sequence, gesture information detection on the current video frame may further depend on the relative information of the previous video frame of the current video frame. For example, before an operation of performing gesture information detection on the image by means of the neural network is executed, the potential gesture category of the previous video frame of the current video frame can further be determined; if the potential gesture category with the maximum probability obtained by detecting the previous video frame of the current video frame is not the gesture-free category, a local region of the current video frame is cut at least according to the position information of the potential hand region output by the previous video frame, and the cut local region is the image input into the neural network.

When cutting the local region of the current video frame, a feasible implementation mode includes: enlarging the potential hand region output by the previous video frame based on the position information of the potential hand region output by the previous video frame; and cutting the local region of the current video frame according to the enlarged potential hand region, the cut local region being image input into the neural network. Another feasible implementation mode includes: enlarging the potential hand region output by the previous video frame based on the position information of the potential hand region output by the previous video frame; respectively offsetting the enlarged potential hand region a predetermined distance with respect to different directions of the position information and respectively cutting; and respectively performing gesture information detection on a plurality of cut potential hand regions and determining a potential hand region with a minimum probability that the potential gesture category is the gesture-free category as the image input into the neural network. The enlarging ratio can be properly set by a person skilled in the art according to actual conditions, because the hand may move between two adjacent frames, the enlarging range relates to enabling the moved hand to be still in the box, and is not required to be excessively large. For example, the enlarged potential hand region is respectively offset a predetermined distance with respect to different directions of the position information, i.e., four directions, including, front, back, left, and right; in this way, image disturbance is implemented, and human optic nerves can be simulated (the human optic nerves would first determine a motion tendency nearby for a previously seen object), so that change conditions of the gesture position can be determined more accurately.

In the continuous video sequence, front and back adjacent video frames are continuous and have great relevance and coherence, rendering that the change between the front and back two frames may be small. Therefore, enlarging and cutting are executed in the current video frame according to the potential hand region of the previous video frame or a certain video frame before the current frame so as to improve detection efficiency. When enlarging and cutting are executed by combining the information of several continuous video frames before the current frame, while improving the detection efficiency, the detection result would also be more accurate.

When the current video frame is an initialization detection frame, i.e., the first video frame of the video frame sequence, or a video frame where the potential gesture category with the maximum probability, by detecting the previous video frame of the initialization detection frame, is the gesture-free category, since no position information of the potential hand region in the previous video frame of the current video frame for reference, at this time, before performing gesture information detection on the image by means of the neural network, a plurality of initial potential hand regions respectively corresponding to a plurality of predetermined initialization detection boxes can be determined in the initialization detection frame; gesture information detection is respectively performed on the plurality of initial potential hand regions and an initial potential hand region with a minimum probability that the potential gesture category is the gesture-free category is cut as the image input into the neural network. The plurality of predetermined initialization detection boxes comprise: a plurality of predetermined initialization detection boxes at different positions, at least two of the initialization detection boxes have same or different sizes.

For example, an RGB camera is used for photographing. For a first frame, 21 initialization detection boxes can be disposed on the video image of the first frame; the image in each initialization detection box is cut to further determine whether a hand exists in the box; if a hand exists, a follow-up operation for determining the gesture category and an operation for determining the position region of the hand can be executed. 21 initialization detection boxes are exemplarily disposed, including four boxes at different position regions and with different sizes, and basically covering the full image and meeting the requirement of application within two meters. Once a hand is detected in a certain box, a tracking state would be entered; for the four boxes at different position regions and with different sizes, the numbers thereof according to the sizes in an ascending order are 2, 4, 6, and 9; the position regions and the sizes are in a certain proportion to the size of the image.

In an optional example, the step S204 is performed by a processor by invoking a corresponding instruction stored in a memory, or is performed by a detection module 802 run by the processor.

At Step S206, if the obtained potential gesture category with the maximum probability is the gesture-free category, position information of the potential hand region of the image is not output; or the position information of the potential hand region of the image and the obtained potential gesture category with the maximum probability are output.

When the potential gesture category includes: a first potential gesture category and a second potential gesture category; the first potential gesture category includes: a gesture-contained category and a gesture-free category; and the second potential gesture category includes: at least two predetermined gesture categories or at least one predetermined gesture category and other gesture categories; the step can be implemented as not to outputting, if the detected first potential gesture category with the maximum probability is the gesture-free category, position information of the potential hand region of the image; or otherwise, outputting the position information of the potential hand region of the image and the detected second potential gesture category with the maximum probability.

In an optional example, step S206 is performed by a processor by invoking a corresponding instruction stored in a memory, or is performed by an output module 804 run by the processor.

According to the embodiment, a pre-trained neural network structure is provided to implement gesture information monitoring, and two network structures for determining whether a hand exists are provided. Meanwhile, gesture continuous identification and tracking are implemented accordingly. The solutions provided by the embodiment are not limited to a static picture, and can also be applied to video or dynamic judgment, i.e., determining an input image of the current frame according to the previous frame of N previous frames so as to perform hand continuous tracking. The gesture identification method in the embodiment may be performed by any appropriate device having image or data processing capability, including, but not limited to, a mobile terminal, a Personal Computer (PC), a server, a vehicle-mounted device, an entertainment device, an advertisement device, or the like.

Figure 3:
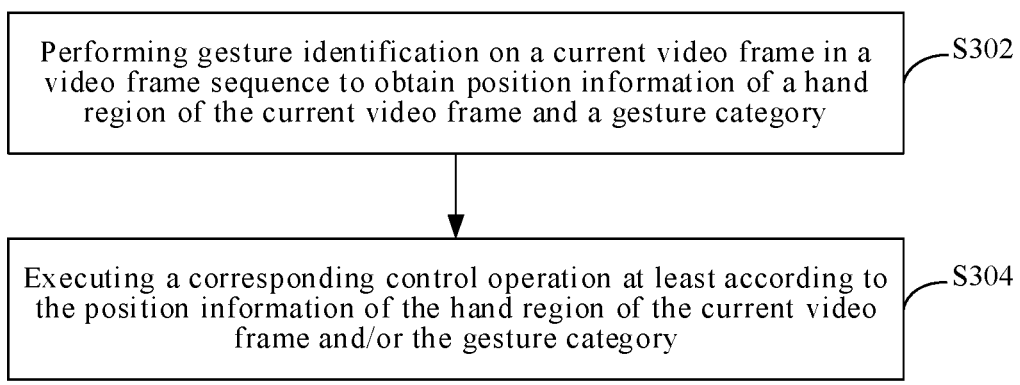
FIG. 3 is a flowchart of a gesture control method according to an embodiment of the present disclosure.

With reference to FIG. 3, a flowchart of a gesture control method according to an embodiment of the present disclosure is shown. The gesture control method in this embodiment includes the following steps.

At Step S302, gesture identification is performed on a current video frame in a video frame sequence to obtain position information of a hand region of the current video frame and a gesture category.

The embodiment can be applied to man-machine interaction for implementing gesture control to execute the corresponding operation on the video frame in the video frame sequence.

When implementing this step, the gesture identification method of any one of the embodiments of the present disclosure can be used for performing gesture identification on the current video frame in the video frame sequence to obtain the position information of the hand region and the gesture category of the current video frame.

In an optional example, step S302 is performed by a processor by invoking a corresponding instruction stored in a memory, or is performed by an identification module 902 run by the processor.

At Step S304, a corresponding control operation is executed at least according to the position information of the hand region of the current video frame and/or the gesture category.

For example, if the gesture category is detected to be an OK hand, an electronic device, such as a smart TV, in an open state can be closed, or if the position of the hand region is detected to move from left to right, a picture shown on a PC can also be moved a corresponding distance from left to right, etc.

In an optional example, step S304 may be performed by a processor by invoking a corresponding instruction stored in a memory, and may also be performed by a control module 904 run by the processor.

By means of the embodiment, accurate identification and detection of the gesture or hand region in the video can be implemented, so as to implement a control operation of a corresponding device, thereby improving man-machine interaction efficiency, and improving interest and participation levels for man-machine interaction.

The gesture control method in the embodiment may be performed by any appropriate device having image or data processing capability, for example, including, but not limited to, a mobile terminal, a Personal Computer (PC), a server, a vehicle-mounted device, an entertainment device, an advertisement device, or the like.

Figure 4:
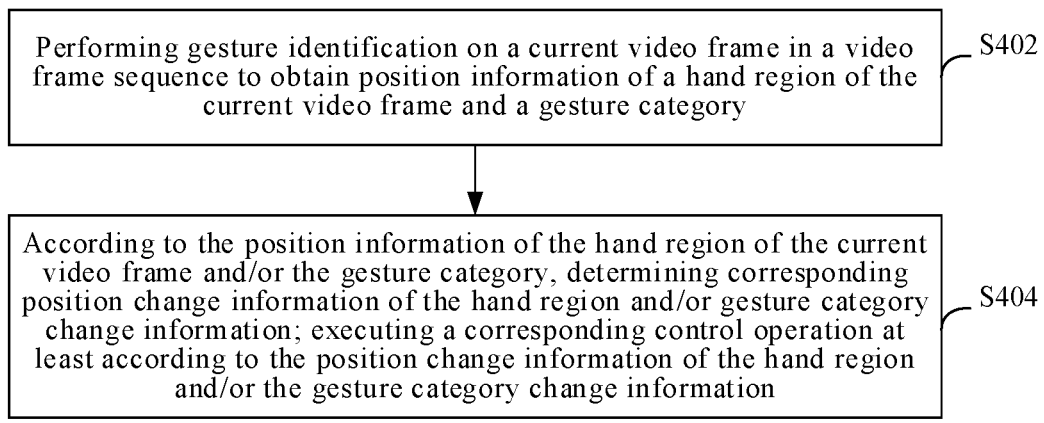
FIG. 4 is a flowchart of a gesture control method according to another embodiment of the present disclosure.

With reference to FIG. 4, a flowchart of a gesture control method according to another embodiment of the present disclosure is shown. The gesture control method in this embodiment includes the following steps.

At Step S402, gesture identification is performed on a current video frame in a video frame sequence to obtain position information of a hand region of the current video frame and a gesture category.

The embodiment can be applied to man-machine interaction for implementing gesture control to execute the corresponding operation on the video frame in the video frame sequence.

When implementing this step, the gesture identification method of any one of the embodiments of the present disclosure can be used for performing gesture identification on the current video frame in the video frame sequence to obtain the position information of the hand region of the current video frame and the gesture category. The gesture category is the potential gesture category output by the neural network, i.e., the obtained potential gesture category with the maximum probability by means of the neural network. The gesture category is as stated in the embodiment of the gesture identification method, and is not repeated herein.

In an optional example, step S402 is performed by a processor by invoking a corresponding instruction stored in a memory, or is performed by an identification module 1002 run by the processor.

At Step S404, according to the position information of the hand region of the current video frame and/or the gesture category, corresponding position change information of the hand region and/or gesture category change information are determined; a corresponding control operation is executed at least according to the position change information of the hand region and/or the gesture category change information.

In an implementation, change information between the position information of the hand region of the current video frame and/or the gesture category and position information of a hand region of at least one earlier and continuous video frame and/or a gesture category is determined; and the corresponding control operation is executed according to the change information.

When determining the change information above, the current video frame can be compared with the adjacent earlier previous video frame, to obtain corresponding change information, for example, by means of comparison, the gesture category is determined to be changed from the OK hand to a five-finger splaying hand, and therefore, the smart TV can return to a homepage from a current display interface. The current video frame can be compared with a plurality of earlier and continuous video frames, and continuous change information is formed according to the change information between adjacent frames, so as to execute the corresponding control operation, for example, by comparing the current video frame with three earlier and continuous video frames, the continuous position change information of the hand region is obtained, a hand movement track is formed, and an electronic device is correspondingly unlocked according to the movement track.

It should be explained that the video frame above may be a video frame in a video frame sequence that is actually photographed or may also be a sampling frame or a key frame in a photographed video frame sequence.

In an implementation, when the change information indicates the change in the gesture category, the executing the corresponding control operation according to the change information may include: switching from a control operation corresponding to a gesture category of a previous video frame to the control operation corresponding to the gesture category of the current video frame in response to that the change information represents the gesture category of the current video frame is different from the gesture category of the previous video frame. When the change information indicates the change in the position, the executing the corresponding control operation according to the change information includes: executing an object moving operation corresponding to a position information change in response to that the change information represents the position information of the hand region of the current video frame is different from position information of a hand region of the previous video frame.

In addition, under certain conditions, the gesture category and the hand region position may change at the same time. For the changes at the same time, a person skilled in the art could set how to execute a control operation according to actual conditions. For example, it can be set as only executing the control operation corresponding to the change in the gesture category; or only executing the control operation corresponding to the change in the hand region position; or executing the control operation corresponding to the change in the gesture category and executing the control operation corresponding to the change in the hand region position; or executing the control operation corresponding to the changes in the gesture category and hand region position. For example, at the same time when detecting that the gesture category is changed from a pistol hand into a five-finger splaying hand, and the hand region position is also moved from left to right, the currently displayed picture can be amplified at first and then the image is moved a corresponding distance from left to right; or the image is moved a corresponding distance from left to right first and then amplified; or an operation of amplifying the currently displayed picture to the full screen is executed.

In an optional example, step S404 may be performed by a processor by invoking a corresponding instruction stored in a memory, and may also be performed by a control module 1004 run by the processor.

By means of the embodiment, accurate identification and detection of the gesture or hand region in the video can be implemented, so as to implement a control operation of a corresponding device, thereby improving man-machine interaction efficiency, and improving interest and participation levels for man-machine interaction.

Figure 5:
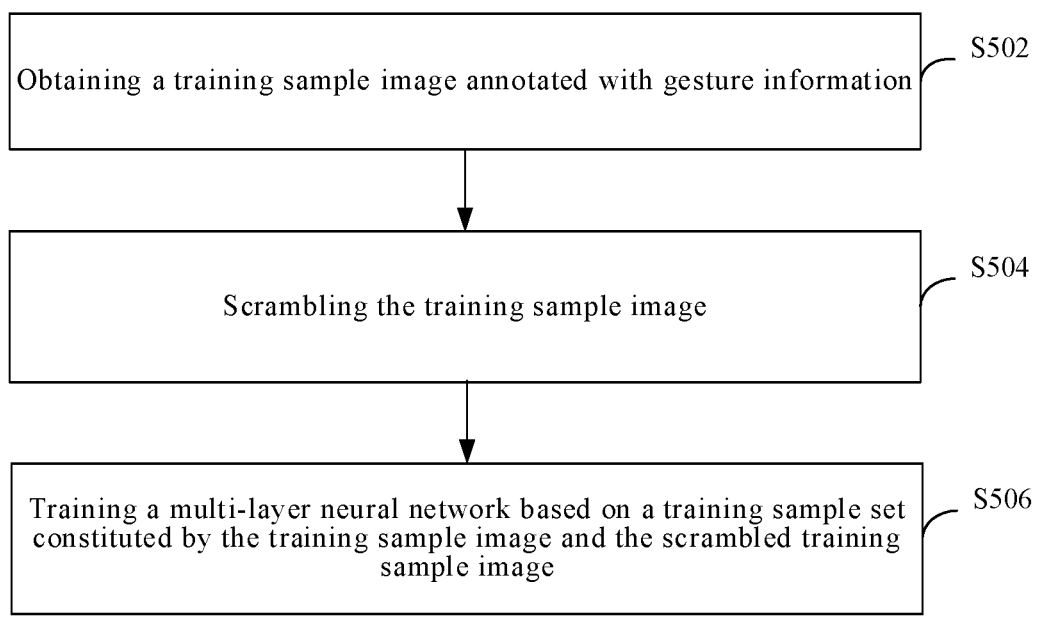
FIG. 5 is a flowchart of a neural network training method according to an embodiment of the present disclosure.

With reference to FIG. 5, a flowchart of a neural network training method according to an embodiment of the present disclosure is shown.

The neural network training method in this embodiment includes the following steps.

At Step S502, a training sample image annotated with gesture information is obtained.

The annotation for the gesture information in the training sample image can be determined by a person skilled in the art according to actual requirements, for example, it may include, but not limited to, any one or more of: the gesture-free, gesture-contained, gesture category, other gesture categories, hand region position, and other annotation information. The gesture category for example may include, but not limited to: a flat propping hand, thumbs-up, a pistol hand, an OK hand, a peach heart hand, a V-shaped hand, a five-finger splaying hand, etc., while other gesture categories may be gesture categories expect the gesture categories above.

In an optional example, the step S502 may be performed by a processor by invoking a corresponding instruction stored in a memory, and may also be performed by a sample obtaining module 1102 run by the processor.

At Step S504, the training sample image is scrambled.

For example, scrambling such as translation, scaling, and mirroring are performed on the training sample image.

Scrambling may expand the training sample images to prevent overfitting. When the number of the training sample images is small, a condition of fitting of the convolutional neural networks may appear, which does not facilitate the accuracy for training and detection of the neural network, and therefore, when the training sample images are a few, the training sample images are expanded by scrambling.

In an optional example, the step S504 may be performed by a processor by invoking a corresponding instruction stored in a memory, and may also be performed by a sample scrambling module 1104 run by the processor.

At Step S506, the neural network is trained based on a training sample set constituted by the training sample image and the scrambled training sample image.

In an optional example, step S506 may be performed by a processor by invoking a corresponding instruction stored in a memory, and may also be performed by a neural network training module 1106 run by the processor.

Training the neural network is a process for multiple iterations. In each training, the training parameter of the neural network can be adjusted in an inverse broadcasting mode according to a difference between identification information of the gesture category of the neural network and the preceding annotation information, for example, adjusting a convolutional kernel parameter of a convolutional neural network and/or a weight parameter in the convolutional neural network, until the training result meets a training termination condition. The training termination condition may be set by a person skilled in the art according to actual conditions, for example, setting a proper training iteration time or setting a corresponding convergence condition.

The neural network which completes the training process can effectively implement the gesture identification.

According to the embodiment, training the training sample set constituted by the training sample image and the scrambled training sample image achieves the neural network for accurately identifying a gesture in an image. Applying the neural network to scenes such as gesture identification or gesture control can accurately and effectively achieve corresponding functions.

Figure 6:
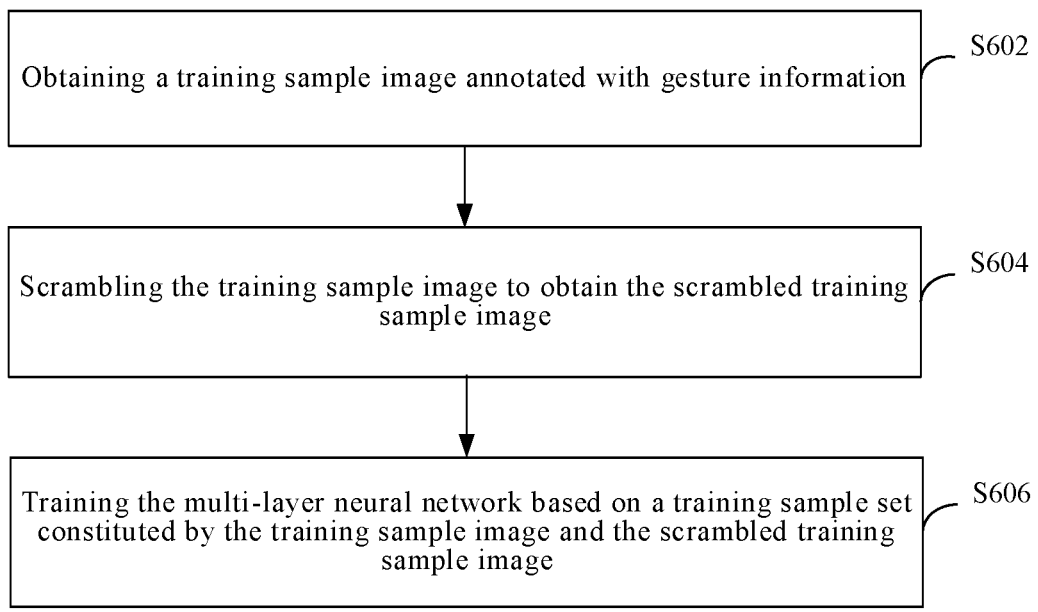
FIG. 6 is a flowchart of a neural network training method according to another embodiment of the present disclosure.

The neural network training method in the embodiment may be performed by any appropriate device having image or data processing capability, for example, including, but not limited to, a mobile terminal, a Personal Computer (PC), a server, a vehicle-mounted device, an entertainment device, an advertisement device, or the like. With reference to FIG. 6, a flowchart of a neural network training method according to another embodiment of the present disclosure is shown. The neural network training method in this embodiment includes the following steps.

At Step S602, a training sample image annotated with gesture information is obtained.

The training sample image in the embodiment may include a static image and may also include a video frame image in a video frame sequence. Moreover, the training sample image in the embodiment both includes a positive sample image and also includes a negative sample image.

In an implementation, the training sample image may include a first original image containing a gesture and a second original image not containing a gesture.

The gesture in the collected first original image containing the gesture is annotated, wherein the annotation, for example, may include a category annotation, a position annotation, and a probability annotation; then based on annotation information of the annotation, the first original image is processed to obtain a positive sample image of the gesture. Processing the first original image may include: obtaining the annotation information of the first original image; according to the annotation information, cutting a gesture image from the first original image as the positive sample image of the gesture. For example, taking a rectangular box annotated using the annotation information as a center, an image with a size three times of the size of the rectangular box is cut as the positive sample image. If the image with the three-time size exceeds the range of the original image, an exceeding part can be filled using gray.

Processing the collected second original image not containing a gesture can obtain the negative sample image of the gesture. Processing the second original image may include: obtaining the second original image not containing a gesture; cutting an image region from the second original image not containing a gesture as the negative sample image of the gesture. The second original image not containing a gesture may be an image not containing a gesture or may also by an image containing a gesture but not containing a set gesture category. The second original image not containing a gesture can be cut in any mode, for example, randomly cutting, to using the image of the cut image region as the negative sample image of the gesture.

It should be explained that, to simplify expressions, the embodiments of the present disclosure merely use the first original image and the second original image to distinguish the collected images. However, a person skilled in the art should know that, in actual usage, the collected first original image and second original image are both image sets, and each image in the image sets is correspondingly processed with reference to the processing on the first original image and the second original image above.

Generating corresponding positive and negative sample images by cutting and processing the collected first and second original images can enable the training of gesture identification in the image to be more targeted and can improve training efficiency and accuracy.

In an optional example, the step S602 may be performed by a processor by invoking a corresponding instruction stored in a memory, and may also be performed by a sample obtaining module 1202 run by the processor.

At Step S604, the training sample image is scrambled to obtain the scrambled training sample image.

After obtaining the positive and negative sample images, the positive and negative sample images are scrambled.

In the embodiments of the present disclosure, feasible scrambling method includes, but not limited to: translation processing, scaling processing, and mirroring processing performed on the positive and negative sample images.

Scrambling may enlarge the number of the training sample images to prevent overfitting and influencing the accuracy level of the neural network training.

In an optional example, the step S604 may be performed by a processor by invoking a corresponding instruction stored in a memory, and may also be performed by a sample scrambling module 1204 run by the processor.

At Step S606, the neural network is trained based on a training sample set constituted by the training sample image and the scrambled training sample image.

In this embodiment, the neural network uses the structure of a convolutional neural network, wherein the first neural network is used for detecting the potential hand region in the image and the second neural network is used for detecting the potential gesture category and the potential gesture category probability.

The first convolutional neural network and the second convolutional neural network may be two neural networks that are independent from each other and may also be implemented in the form of two branches of a same convolutional neural network. When the first convolutional neural network and the second convolutional neural network are two branches of a same convolutional neural network, the two branches share the input layer and convolutional layer structure of the same convolutional neural network. Using the form of two branches of a same convolutional neural network reduces design and implementing costs for the convolutional neural network on one hand, and on the other hand, two branches can share the processing result of the corresponding structure, thus improving the training speed and efficiency of the neural network.

The input layer and the convolutional layer part of the first and second convolutional neural networks may be conventionally set. Moreover, as known by a person skilled in the art, the convolutional layer part not only includes a convolutional layer but also includes other layers conventionally set, such as a pooling layer, and a ReLU layer. The setting and function of each layer are not repeated herein.

For the first convolutional neural network and the second convolutional neural network to be two neural networks that are independent from each other, the first neural network can be trained based on the positive sample in the training sample set, and after training the first neural network is completed, a network parameter of the multiplexed network input layer and partial convolutional layer is fixed and the second neural network is trained based on the positive sample and a negative sample in the training sample set. The first neural network is trained using the positive sample; upon the first neural network is trained, the first neural network may be forced to find a potential hand region in each image, no matter whether a hand exists in the image. In this way, the image region required to be identified is reduced. Moreover, the second neural network is trained based on the positive and negative samples, no-hand is used as a type of gestures by means of the negative sample, and there is no need to separately determine whether a hand exists in the image.

During training, the first convolutional neural network is trained first, to obtain the network having a function of detecting the potential hand region in the image, and then the second convolutional neural network is trained, to obtain the network having a function of identifying the potential gesture category and the potential gesture category probability, wherein monitoring information (which can be represented as the parameter in a loss function) used during the process of training the second convolutional neural network is determined based on the detection result of the potential hand region in the original image by the trained first convolutional neural network. Monitoring information of the first convolutional neural network is determined based on the annotation information of the gesture in the training sample image.

According to one or more embodiments of the present disclosure, the positive sample image of the gesture can be first obtained, and the positive sample image can be scrambled, to obtain the scrambled positive sample image; the scrambled positive sample image is used to train the first convolutional neural network as the convolutional neural network for determining the potential hand region in the image. As stated above, the mode for implementing that the positive sample image of the gesture is obtained and the positive sample image is scrambled, to obtain the scrambled positive sample image may adopt obtaining the annotation information of the gesture in the original image; according to the annotation information, cutting the gesture image from the original image as the positive sample image of the gesture; and scrambling the positive sample image to obtain the scrambled positive sample image. Scrambling may include translation processing, scaling processing, mirroring processing, etc.

It should be noted that under the condition that the first convolutional neural network is trained, training the positive sample image of the second convolutional neural network may directly use the positive sample image of the trained first convolutional neural network. On this basis, the negative sample image of the gesture is further obtained and used as the training sample image of the second convolutional neural network. The mode of obtaining an original image not containing a gesture and cutting an image region from the original image not containing a gesture as a negative sample image of the gesture can be used for implementing obtaining of the negative sample image of the gesture. Not limited to this, the training sample image for training the second convolutional neural network is trained may certainly also use a brand new sample image. The brand new sample image may be sample images including the positive and negative samples, and may also be sample images of all positive samples. Using the sample images of all positive samples, the detection result would necessarily output a potential hand region, even if no hand exists, a potential hand region would also be output. In this way, robustness of the follow-up detection is increased and the all positive sample training only relates to learning the hand features without assistance from the negative sample.

After determining the training sample image, the monitoring information, etc. of the second convolutional neural network, the training of the second convolutional neural network can be started. The training sample image can be scrambled, and the scrambled training sample image can be input by means of the input layer of the second convolutional neural network. The positive sample image of the gesture is scrambled during training of the first convolutional neural network model, and therefore, it can be directly used without being scrambled again.

After the scrambled training sample image is processed by the convolutional layer part of the second convolutional neural network model, information of corresponding potential gesture category and potential gesture category probability is obtained; a difference between the potential gesture category and the potential gesture category probability and the annotation information of the gesture annotated in the training sample image is determined using the monitoring information; furthermore, the second convolutional neural network can be trained according to the difference; for example, the training parameter of the second convolutional neural network is adjusted, such as, the value of a convolution kernel, the weight of a linear variation of an output between layers, etc.

In another implementation, the second neural network may include a first sub-neural network and a second sub-neural network multiplexing the network input layer and the partial convolutional layer. For the first convolutional neural network and the second convolutional neural network to be two neural networks of the same convolutional neural network, the implementation of the step may include: training the first neural network based on the positive sample in the training sample set, and after training the first neural network is completed, fixing a network parameter of the multiplexed network input layer and partial convolutional layer and training the first sub-neural network and the second sub-neural network based on the positive sample and a negative sample in the training sample set. In this mode, the first sub-neural network determines whether a hand exists, and directly returns back to the potential hand region if no hand exists without outputting, and the second sub-neural network further determines which gesture it is. In this way, the numbers of each category of training samples in the first and second sub-neural networks are basically consistent, and a phenomenon that a certain category is well trained but other effects are bad would not occur, for example, the numbers of hand-contained and no-hand samples are basically the same, the number of samples of the gesture in each category is similar, and it would make the training of the samples of many different gestures be similar to that of the no-hand samples.

Different from the independent two convolutional neural networks, the first sub-neural network and the second sub-neural network share the convolutional result of the first neural network; the first sub-neural network is used for training for the potential hand region detection; the second sub-neural network is used for training for the potential gesture category and potential gesture category probability; the training of the second sub-neural network depends on the detection result output by the first sub-neural network. The training for the first sub-neural network and the second sub-neural network may be implemented by referring to the previous related parts of the training of the two independent neural networks, and is not repeated herein.

The first convolutional neural network and the second convolutional neural network are two branches for the same convolutional neural network, and the training speed thereof is faster than independent computing of two neural networks, so that the convolutional neural network may reach an extremely fast computing speed. The first convolutional neural network and the second convolutional neural network, based on an RGB image, may be applied to all existing RGB cameras in the market, such as front and rear cameras of cellphones, cameras for notebook computers, etc., and are extremely universal. In an optional example, step S606 may be performed by a processor by invoking a corresponding instruction stored in a memory, and may also be performed by a neural network training module 1206 run by the processor.

The abovementioned neural network training method of the embodiments of the present disclosure is exemplarily illustrated using an example as follows: The neural network training of this example includes the following processes:

(I) A first convolutional neural network is trained.

It includes: annotating a position region of a gesture using a rectangular box in each collected image containing a gesture as monitoring information; cutting a region near the gesture and scaling to a specified size, for example, maintaining an aspect ratio of an original image, and scaling a long edge to 320 pixels, and determining the size of a short edge for scaling according to the specified long edge size and aspect ratio of the original image; scrambling the scaled region image, such as translation, scaling, and mirroring, wherein scrambling may also prevent overfitting while implementing gesture prediction; inputting the scrambled image into the first convolutional neural network, training the convolutional neural network using a gradient descent method and an inverse broadcasting algorithm, and optimizing the parameter of each layer in the network, wherein the output of the convolutional neural network during the training process is using the annotated rectangular box, i.e., a rectangular box of the gesture in the cut image, i.e., the potential hand region, as the monitoring information; completing the training the first convolutional neural network.

(II) A second convolutional neural network is trained.

It includes: collecting and adding another batch of images containing a non-gesture or not containing a gesture; randomly selecting a rectangular box to cut in the images; scrambling the cut images; establishing a second convolutional neural network based on the first convolutional neural network, for example, adding a convolutional layer and multiple full connection layers after the second-to-last convolutional layer and before the last convolutional layer of the first convolutional neural network; also training the convolutional neural network using a gradient descent method and an inverse broadcasting algorithm, and optimizing the parameter of each layer in the network, but at this time, remaining the previous parameter of the first convolutional neural network unchanged, for example, maintaining the parameter of the first convolutional neural network unchanged by means of setting a training coefficient; training a parameter in the second convolutional neural network; an output of the second convolutional neural network being the potential gesture category in the rectangular box, including: several categories such as non-predetermined gesture category (referred to as other gesture categories), hand-free in the rectangular box (the gesture-free category), and a predetermined gesture category (for example, including, but not limited to, a flat propping hand, thumbs-up, a pistol hand, an OK hand, a peach heart hand, a V-shaped hand, and a five-finger splaying hand). The monitoring information is obtained according to a distance between the rectangular box obtained by the first convolutional neural network and the annotated rectangular box and the annotated gesture category together. One distance between the rectangular box obtained by the first convolutional neural network and the annotated rectangular box may be determined by means of: determining two points, i.e., an upper left corner and a lower right corner of the rectangular box; the distance between the two rectangular boxes may be dividing the sum of the distance between the two upper left corners and the distance between the two lower right corners by the sum of diagonal lines of the two rectangular boxes.

In actual applications, a structure of implementing the abovementioned convolutional neural network in the form of using two branches of the same convolutional neural network is shown as follows: The second sub-convolutional neural network is established based on the first sub-convolutional neural network; a convolutional layer and multiple full connection layers are added after the second-to-last convolutional layer and before the last convolutional layer in the first sub-convolutional neural network; the second sub-convolutional neural network is trained using the gradient descent method and the inverse broadcasting algorithm, and the parameter of each layer is optimized, but at the same time, the previous parameter of the first sub-convolutional neural network is maintained unchanged and a parameter in the second convolutional neural network is trained. The structure of the convolutional neural network is as follows:

//first part
1. Data input layer
//second part
2. $<=1$ convolutional layer ($3\lambda3\times4/2$)
3. $<=2$ nonlinear response ReLU layer
4. $<=3$ norm layer//local response normalization layer, for normalization of
a local input region
5. $<=4$ pooling layer
6. $<=5$ convolutional layer ($3\lambda3\times6/2$)
7. $<=6$ nonlinear response ReLU layer
8. $<=7$ norm layer
9. $<=8$ pooling layer
10. $<=9$ convolutional layer ($3\times3\times12/2$)
11. $<=10$ nonlinear response ReLU layer
12. $<=11$ convolutional layer ($3\times3\times12$)
13. $<=12$ nonlinear response ReLU layer
//third part
//a branch: target gesture tracking branch:
14. $<=13$ convolutional layer ($3\times3\times12$)
15. $<=14$ nonlinear response ReLU layer
16. $<=15$ pooling layer
17. $<=16$ full connection layer
18. $<=17$ nonlinear response ReLU layer
19. $<=18$ drop layer//dropout layer for preventing network overfitting
20. $<=19$ full connection layer
21. $<=20$ nonlinear response ReLU layer
22. $<=21$ drop layer
23. $<=22$ full connection layer
//b branch: target gesture identification branch:
24. $<=13$ convolutional layer ($3\times3\times12$)
25. $<=24$ nonlinear response ReLU layer
26. $<=25$ full connection layer
27. $<=26$ nonlinear response ReLU layer
28. $<=27$ full connection layer
29. $<=28$ nonlinear response ReLU layer
30. $<=29$ full connection layer
It should be explained that:
First, a branch and b branch above share first 13 layers of structures, which saves the design and implementing costs for the convolutional neural network model. Second, a branch above is executed first and b branch is executed later.

Third, in this embodiment, a branch above is mainly used for implementing detection of the potential hand region and b branch is mainly used for implementing detection of the potential gesture category and the potential gesture category probability.

Fourth, in the explanation of the abovementioned convolutional network structure, 2. $<=1$ indicates that a current layer is a second layer, and an input is a first layer; the bracket after the convolutional layer is the parameter of the convolutional layer; ($3\times3\times16$) indicates the size of the convolutional kernel is $3\lambda3$ and the channel number is 16. The rest may be deduced by analogy, and may not be repeated herein. In the abovementioned convolutional network structure, a nonlinear response unit exists after every convolutional layer.

The convolutional kernel is set to be $3\times3$, which may better synthesize the local information; setting a stride of the convolutional layers may enable an upper feature to obtain a wider view field without increasing a computing amount.

However, a person skilled in the art should know that the size and channel number of the convolutional kernel and the number of the layers of the convolutional layers are all exemplarily explanations; in actual applications, a person skilled in the art can adjust adaptively according to actual requirements, which is not limited in the embodiments of the present disclosure. In addition, the combination and parameter of all layers in the convolutional network model in this embodiment are optional and can be arbitrarily combined.

According to this embodiment, scrambling the training sample image may prevent training overfitting; moreover, the potential hand region determined by the first convolutional neural network is used as the basis for determining the monitoring information of the second convolutional neural network and the training effect of the second convolutional neural network is determined according to the monitoring information; on one hand, the second convolutional neural network does not need to determine the potential hand region, thereby improving the training speed and efficiency of the second convolutional neural network; on the other hand, the first convolutional neural network is a trained neural network, and can accurately detect the potential hand region in the image, which more facilitates the follow-up training of the second convolutional neural network regarding identification of the potential gesture category and potential gesture category probability in the region, so as to further improve the training speed and efficiency of the second convolutional neural network.

By means of the solution provided by the embodiments of the present disclosure, target gesture tracking and identification can be implemented based on the RGB image; as a basis for tracking and identification, a target gesture tracking model and a target gesture identification model implement a man-machine interaction system which has an extremely fast computing speed and an extremely strong universality.

Any method provided by the embodiments of the present disclosure is executed by any appropriate device having data processing capability, including, but not limited to, a terminal device and a server. Alternatively, any method provided in the embodiments of the present disclosure is executed by a processor, for example, any method mentioned in the embodiments of the present disclosure is executed by the processor by invoking a corresponding instruction stored in a memory. Details are not described below again.

A person of ordinary skill in the art may understand that: all or some steps of implementing the forgoing embodiments of the method may be achieved by a program by instructing related hardware; the foregoing program may be stored in a computer-readable storage medium; when the program is executed, steps including the foregoing embodiments of the method are performed; moreover, the foregoing storage medium includes various media capable of storing program codes such as an ROM, an RAM, a magnetic disk, or an optical disk.

Figure 7:
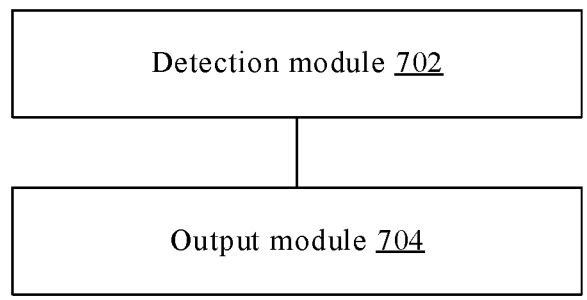
FIG. 7 is a structural block diagram of a gesture identification apparatus according to an embodiment of the present disclosure.

With reference to FIG. 7, a structural block diagram of a gesture identification apparatus according to an embodiment of the present disclosure is shown. The gesture identification apparatus of this embodiment includes: a detection module 702, configured to perform gesture information detection on an image by means of a neural network, to obtain a potential hand region, a potential gesture category and a potential gesture category probability in the image, the potential gesture category comprising a gesture-free category and at least one gesture category; and an output module 704, configured not to output, if the obtained potential gesture category with the maximum probability is the gesture-free category, position information of the potential hand region of the image; or output the position information of the potential hand region of the image and the obtained potential gesture category with the maximum probability.

The gesture identification apparatus of this embodiment is configured to implement the corresponding gesture identification method in the multiple forgoing method embodiments, and has the beneficial effects of the corresponding method embodiments. Details are not described below again.

Figure 8:
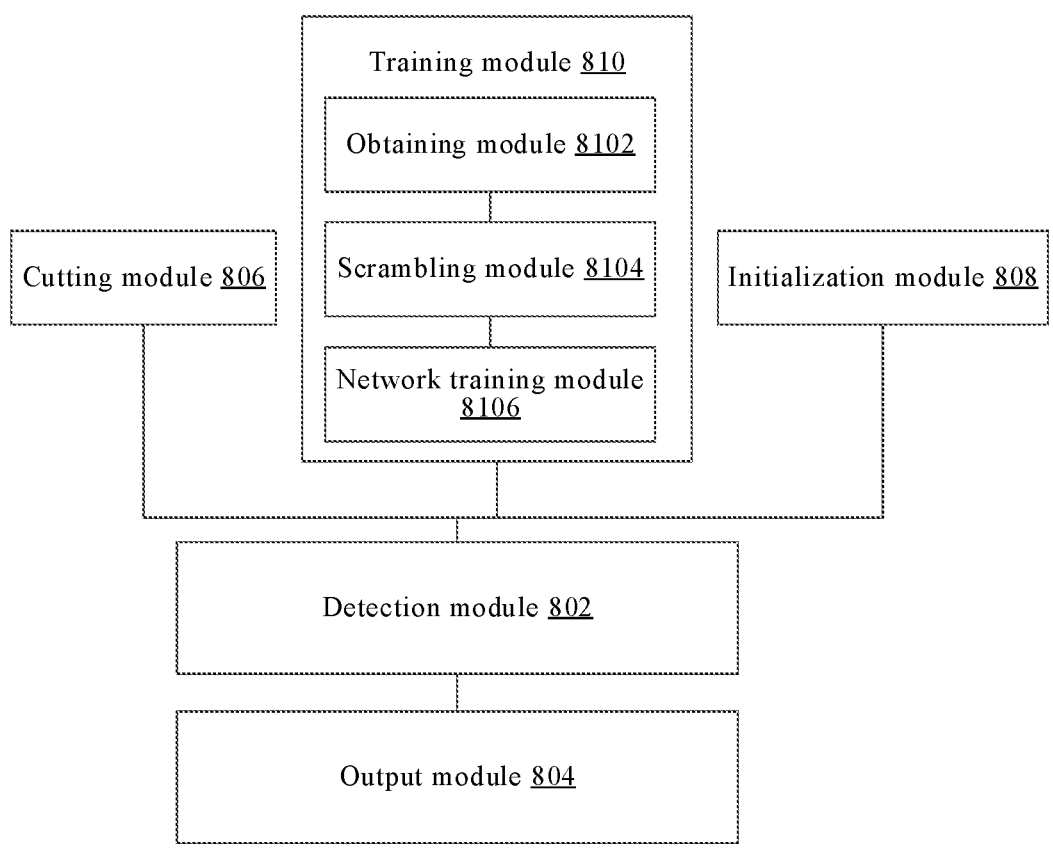
FIG. 8 is a structural block diagram of a gesture identification apparatus according to another embodiment of the present disclosure.

With reference to FIG. 8, a structural block diagram of a gesture identification apparatus according to another embodiment of the present disclosure is shown. The gesture identification apparatus of this embodiment includes: a detection module 802, configured to perform gesture information detection on an image by means of a neural network, to obtain a potential hand region, a potential gesture category and a potential gesture category probability in the image, the potential gesture category comprising a gesture-free category and at least one gesture category; and an output module 804, configured not to output, if the obtained potential gesture category with the maximum probability is the gesture-free category, position information of the potential hand region of the image; or output the position information of the potential hand region of the image and the obtained potential gesture category with the maximum probability.

According to one or more embodiments of the present disclosure, the neural network includes a first neural network and a second neural network multiplexing a network input layer and a partial convolutional layer; the detection module 802 is configured to detect the potential hand region in the image by means of the first neural network and detect the potential gesture category and the potential gesture category probability in the image by means of the second neural network.

According to one or more embodiments of the present disclosure, the at least one gesture category includes: at least one predetermined gesture category; or the at least one gesture category includes: at least one predetermined gesture category and other gesture categories.

According to one or more embodiments of the present disclosure, the potential gesture category includes: a first potential gesture category and a second potential gesture category; the first potential gesture category includes: a gesture-contained category and a gesture-free category; and the second potential gesture category includes: at least two predetermined gesture categories or at least one predetermined gesture category and other gesture categories; and the output module 804 is configured not to output, if the detected first potential gesture category with the maximum probability is the gesture-free category, position information of the potential hand region of the image; or output the position information of the potential hand region of the image and the detected second potential gesture category with the maximum probability.

According to one or more embodiments of the present disclosure, the second neural network includes a first sub-neural network and a second sub-neural network multiplexing the network input layer and the partial convolutional layer; and the detection module 802 is configured to detect the potential hand region in the image by means of the first neural network, detect the first potential gesture category and the potential gesture category probability in the image by means of the first sub-neural network, and detect the second potential gesture category and the potential gesture category probability in the image by means of the second neural network.

According to one or more embodiments of the present disclosure, the apparatus further includes: a cutting module 806, configured to cut, if the potential gesture category with the maximum probability obtained by detecting a previous video frame of the current video frame is not the gesture-free category before the detection module 802 performs gesture information detection on the image by means of the neural network, a local region of the current video frame at least according to the position information of the potential hand region output by the previous video frame, the cut local region being the image input into the neural network.

According to one or more embodiments of the present disclosure, the cutting module 806 is configured to enlarge, if the potential gesture category with the maximum probability obtained by detecting the previous video frame of the current video frame is not the gesture-free category, the potential hand region output by the previous video frame based on the position information, and cut the local region of the current video frame according to the enlarged potential hand region, the cut local region being the image input into the neural network.

According to one or more embodiments of the present disclosure, the cutting module 806 is configured to enlarge, if the potential gesture category with the maximum probability obtained by detecting the previous video frame of the current video frame is not the gesture-free category, the potential hand region output by the previous video frame based on the position information, respectively offset the enlarged potential hand region a predetermined distance with respect to different directions of the position information and respectively cut, and respectively perform gesture information detection on a plurality of cut potential hand regions and determining a potential hand region with a minimum probability that the potential gesture category is the gesture-free category as the image input into the neural network.

According to one or more embodiments of the present disclosure, the apparatus further includes: an initialization module 808, configured to determine, before the detection module 802 performs the gesture information detection on the image by means of the neural network if the current video frame is an initialization detection frame, a plurality of initial potential hand regions respectively corresponding to a plurality of predetermined initialization detection boxes in the initialization detection frame, respectively perform gesture information detection on the plurality of initial potential hand regions, and cut an initial potential hand region with a minimum probability that the potential gesture category is the gesture-free category as the image input into the neural network, where the initialization detection frame is a first video frame in a video frame sequence, or the potential gesture category with the maximum probability obtained by detecting the previous video frame of the initialization detection frame is the gesture-free category.

According to one or more embodiments of the present disclosure, the plurality of predetermined initialization detection boxes comprise: a plurality of predetermined initialization detection boxes at different positions, at least two of the initialization detection boxes have same or different sizes.

According to one or more embodiments of the present disclosure, the apparatus further includes: a training module 810; the training module 810 includes:

an obtaining module 8102, configured to obtain a training sample image annotated with gesture information before the detection module performs gesture information detection on the image by means of the neural network; a scrambling module 8104, configured to scramble the training sample image; and a network training module 8106, configured to train the neural network based on a training sample set constituted by the training sample image and the scrambled training sample image.

According to one or more embodiments of the present disclosure, the network training module 8106 is configured to train the first neural network based on a positive sample in the training sample set; after training the first neural network is completed, fix a network parameter of the multiplexed network input layer and partial convolutional layer and train the second neural network based on the positive sample and a negative sample in the training sample set.

According to one or more embodiments of the present disclosure, the network training module 8106 is configured to train the first neural network based on a positive sample in the training sample set; after training the first neural network is completed, fix a network parameter of the multiplexed network input layer and partial convolutional layer and train the first sub-neural network and the second sub-neural network based on the positive sample and a negative sample in the training sample set.

According to one or more embodiments of the present disclosure, the scrambling, for example, may include, but not limited to, any one or more of: translation processing, scaling processing, and mirroring processing.

According to one or more embodiments of the present disclosure, the at least one gesture category, for example, may include, but not limited to, any one or more of: a flat propping hand, thumbs-up, a pistol hand, an OK hand, a peach heart hand, a V-shaped hand, and a five-finger splaying hand.

The gesture identification apparatus of this embodiment is configured to implement the corresponding gesture identification method in the multiple forgoing method embodiments, and has the beneficial effects of the corresponding method embodiments. Details are not described below again.

Figure 9:
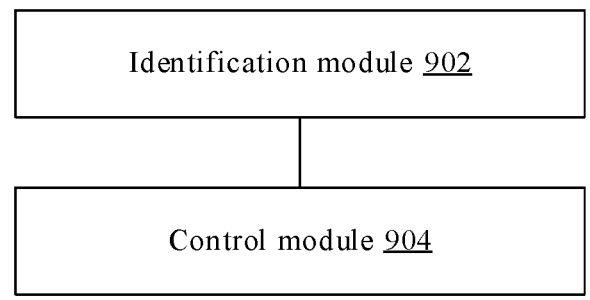
FIG. 9 is a structural block diagram of a gesture control apparatus according to an embodiment of the present disclosure.

With reference to FIG. 9, a structural block diagram of a gesture control apparatus according to an embodiment of the present disclosure is shown. The gesture control apparatus of this embodiment includes: an identification module 902, configured to perform gesture identification on a current video frame in a video frame sequence using the gesture identification method or apparatus according to any one of the embodiments above of the present disclosure, to obtain position information of a hand region of the current video frame and a gesture category; and a control module 904, configured to execute a corresponding control operation at least according to the position information of the hand region of the current video frame and/or the gesture category.

The gesture control apparatus of this embodiment is configured to implement the corresponding gesture control method in the multiple forgoing method embodiments, and has the beneficial effects of the corresponding method embodiments. Details are not described below again.

Figure 10:
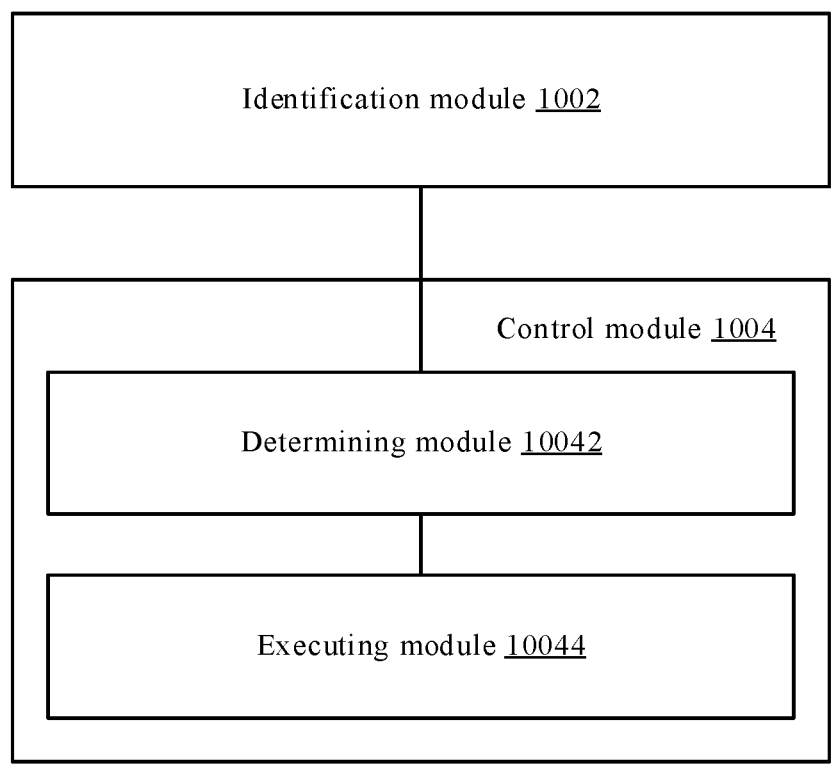
FIG. 10 is a structural block diagram of a gesture control apparatus according to another embodiment of the present disclosure.

With reference to FIG. 10, a structural block diagram of a gesture control apparatus according to another embodiment of the present disclosure is shown. The gesture control apparatus of this embodiment includes: an identification module 1002, configured to perform gesture identification on a current video frame in a video frame sequence using the gesture identification method or apparatus according to any one of the embodiments above of the present disclosure, to obtain position information of a hand region of the current video frame and a gesture category; and a control module 1004, configured to execute a corresponding control operation at least according to the position information of the hand region of the current video frame and/or the gesture category.

According to one or more embodiments of the present disclosure, the control module 1004 includes: a determining module 10042, configured to determine change information between the position information of the hand region of the current video frame and/or the gesture category and position information of a hand region of at least one earlier and continuous video frame and/or a gesture category; and an executing module 10044, configured to execute the corresponding control operation according to the change information.

According to one or more embodiments of the present disclosure, the executing module 10044 is configured to switch from a control operation corresponding to a gesture category of a previous video frame to the control operation corresponding to the gesture category of the current video frame in response to that the change information represents the gesture category of the current video frame is different from the gesture category of the previous video frame.

According to one or more embodiments of the present disclosure, the executing module 10044 is configured to execute an object moving operation corresponding to a position information change in response to that the change information represents the position information of the hand region of the current video frame is different from position information of a hand region of the previous video frame.

The gesture control apparatus of this embodiment is configured to implement the corresponding gesture control method in the multiple forgoing method embodiments, and has the beneficial effects of the corresponding method embodiments. Details are not described below again.

Figure 11:
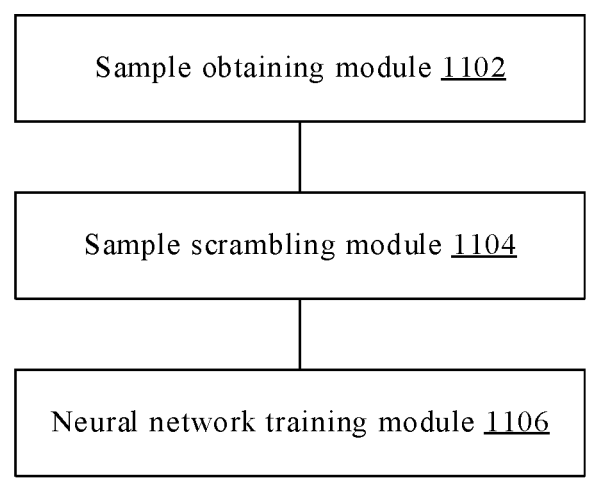
FIG. 11 is a structural block diagram of a neural network training apparatus according to an embodiment of the present disclosure.

With reference to FIG. 11, a structural block diagram of a neural network training apparatus according to an embodiment of the present disclosure is shown. The neural network training apparatus of this embodiment includes: a sample obtaining module 1102, configured to obtain a training sample image annotated with gesture information; a sample scrambling module 1104, configured to scramble the training sample image; and a neural network training module 1106, configured to train the neural network based on a training sample set constituted by the training sample image and the scrambled training sample image.

The neural network training apparatus of this embodiment is configured to implement the corresponding neural network training method in the forgoing multiple method embodiments, and has the beneficial effects of the corresponding method embodiments. Details are not described here again.

Figure 12:
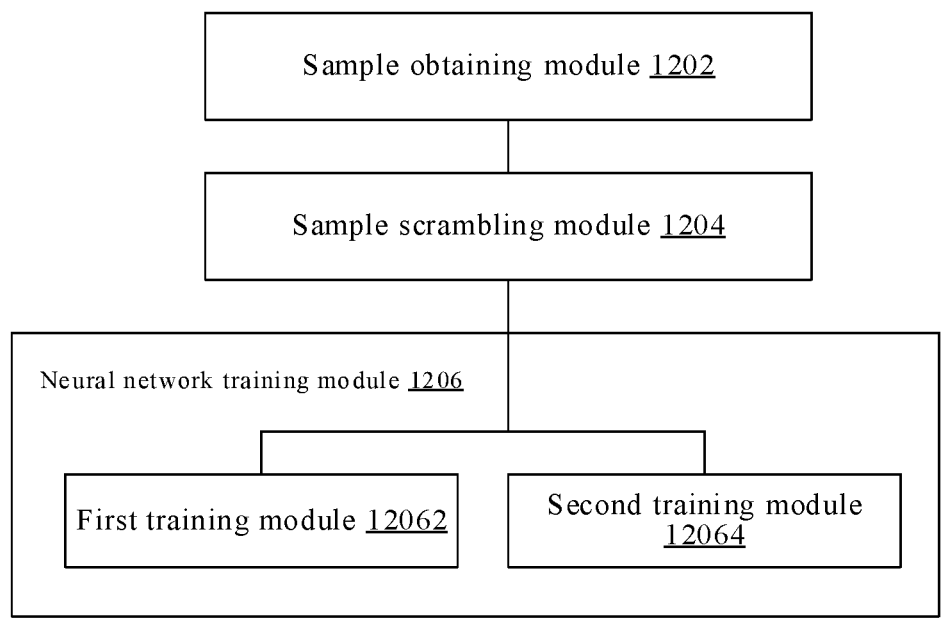
FIG. 12 is a structural block diagram of a neural network training apparatus according to another embodiment of the present disclosure.

With reference to FIG. 12, a structural block diagram of a neural network training apparatus according to another embodiment of the present disclosure is shown. The neural network training apparatus of this embodiment includes: a sample obtaining module 1202, configured to obtain a training sample image annotated with gesture information; a sample scrambling module 1204, configured to scramble the training sample image; and a neural network training module 1206, configured to train the neural network based on a training sample set constituted by the training sample image and the scrambled training sample image.

According to one or more embodiments of the present disclosure, the neural network training module 1206 includes: a first training module 12062, configured to train the first neural network based on a positive sample in the training sample set; after training the first neural network is completed, fix a network parameter of the multiplexed network input layer and partial convolutional layer and train the second neural network based on the positive sample and a negative sample in the training sample set.

According to one or more embodiments of the present disclosure, the second neural network may include a first sub-neural network and a second sub-neural network multiplexing the network input layer and the partial convolutional layer. In this embodiment, the neural network training module 1206 includes: a second training module 12064, configured to train the first neural network based on a positive sample in the training sample set; after training the first neural network is completed, fix a network parameter of the multiplexed network input layer and partial convolutional layer and train the first sub-neural network and the second sub-neural network based on the positive sample and a negative sample in the training sample set.

According to one or more embodiments of the present disclosure, the scrambling, for example, may include, but not limited to, any one or more of: translation processing, scaling processing, and mirroring processing.

According to one or more embodiments of the present disclosure, the at least one gesture category, for example, may include, but not limited to, any one or more of: a flat propping hand, thumbs-up, a pistol hand, an OK hand, a peach heart hand, a V-shaped hand, and a five-finger splaying hand.

The neural network training apparatus of this embodiment is configured to implement the corresponding neural network training method in the forgoing multiple method embodiments, and has the beneficial effects of the corresponding method embodiments. Details are not described here again.

In addition, embodiments of the present disclosure further provide an electronic device, including: a processor and a memory; the memory is configured to store at least one executable instruction enabling the processor to execute an operation corresponding to the gesture identification method according to any one of the embodiments above of the present disclosure, or to execute an operation corresponding to the gesture control method according to any one of the embodiments above of the present disclosure, or to execute an operation corresponding to the neural network training method according to any one of the embodiments above of the present disclosure. The electronic device in the embodiments of the present disclosure, for example, may be a mobile terminal, a personal computer (PC), a tablet computer, a server, and the like.

Figure 13:
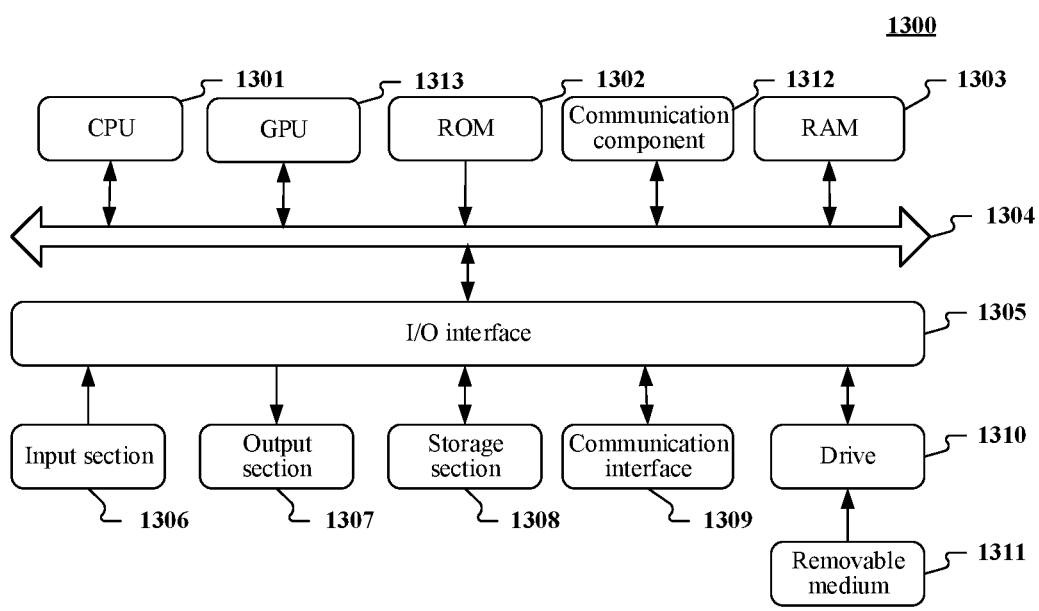
FIG. 13 is a structural schematic diagram of an electronic device according to an application embodiment of the present disclosure.

Referring to FIG. 13 below, a schematic structural diagram of an electronic device 1300 suitable for implementing the embodiments of the present disclosure is shown. As shown in FIG. 13, the electronic device 1300 includes one or more processors, a communication element, and the like. The one or more processors are, for example, one or more Central Processing Units (CPUs) 1301 and/or one or more Graphic Processing Units (GPUs) 1313, and may execute appropriate actions and processing according to executable instructions stored in a Read-Only Memory (ROM) 1302 or executable instructions loaded from a storage portion 1308 to a Random Access Memory (RAM) 1303. The communication element includes a communication component 1312 and/or a communication interface 1309. The communication component 1312 includes, but is not limited to, a network card, and the network card includes, but is not limited to, an InfiniBand (IB) network card. The communication interface 1309 includes a communication interface of a network interface card such as an LAN card and a modem, and the communication interface 1309 performs communication processing via a network such as the Internet.

The processor is communicated with the ROM 1302 and/or RAM 1303 to execute executable instructions, is connected to the communication component 1312 by means of the communication bus 1304, and is communicated with other target devices by means of the communication component 1312, so as to complete an operation corresponding to any method provided in the embodiments of the present disclosure. For example, gesture information detection is executed by means of the neural network, to obtain the potential hand region, potential gesture category and potential gesture category probability in the image; the potential gesture category includes: a gesture-free category and at least one gesture category; and if the obtained potential gesture category with the maximum probability is the gesture-free category, not outputting position information of the potential hand region of the image; or otherwise, outputting the position information of the potential hand region of the image and the obtained potential gesture category with the maximum probability. Or, for example, the aforementioned gesture identification method is used for performing gesture identification on the current video frame in the video frame sequence, to obtain the position information of the hand region of the current video frame and the gesture category; executing a corresponding control operation at least according to the position information of the hand region of the current video frame and/or the gesture category. Or, for example: obtaining a training sample image annotated with gesture information; scrambling the training sample image; and training the neural network based on a training sample set constituted by the training sample image and the scrambled training sample image.

In addition, the RAM 1303 further stores various programs and data required for operations of the apparatus. The CPU 1301 or GPU 1313, the ROM 1302, and the RAM 1303 are connected to each other by means of the communication bus 1304. In the case that the RAM 1303 exists, the ROM 1302 is an optional module. The RAM 1303 stores executable instructions, or writes the executable instructions to the ROM 1302 during running, where the executable instructions enable the processor to perform corresponding operations of the foregoing communication method. An Input/output (I/O) interface 1305 is also connected to the communication bus 1304. The communication component 1312 is integrated, or is configured to have a plurality of sub-modules (for example, a plurality of IB network cards) linked on the communication bus.

The following components are connected to the I/O interface 1305: an input section 1306 including a keyboard, a mouse and the like; an output section 1307 including a Cathode-Ray Tube (CRT), a Liquid Crystal Display (LCD), a loudspeaker and the like; the storage section 1308 including hardware and the like; and the communication interface 1309 of a network interface card such as an LAN card and a modem. A drive 1310 is also connected to the I/O interface 1305 according to requirements. A removable medium 1311 such as a magnetic disk, an optical disk, a magneto-optical disk, a semiconductor memory or the like is mounted on the drive 1310 according to requirements, so that a computer program read from the removable medium is installed on the storage section 1308 according to requirements.

It should be noted that the architecture illustrated in FIG. 13 is merely an optional implementation mode. During practice, the number and types of the parts in FIG. 13 may be selected, decreased, increased, or replaced according to actual requirements. Different functional parts may be separated or integrated or the like. For example, the GPU and the CPU may be separated, or the GPU may be integrated on the CPU, and the communication element may be separated from or integrated on the CPU or the GPU or the like. These alternative implementations all fall within the scope of protection of the present disclosure.

Particularly, the process described above with reference to the flowchart according to the embodiments of the present disclosure is implemented as a computer software program. For example, the embodiments of the present disclosure include a computer program product, which includes a computer program tangibly included in a machine-readable medium. The computer program includes a program code for executing a method shown in the flowchart. The program code may include corresponding instructions for correspondingly executing steps of the methods provided by the embodiments of the present disclosure, such as performing the gesture information detection on the image by means of the neural network, to obtain the potential hand region, the potential gesture category and the potential gesture category probability in the image, the potential gesture category comprising a gesture-free category and at least one gesture category; and if the obtained potential gesture category with the maximum probability is the gesture-free category, not outputting position information of the potential hand region of the image; or otherwise, outputting the position information of the potential hand region of the image and the obtained potential gesture category with the maximum probability. Or, for example, the aforementioned gesture identification method is used for performing gesture identification on the current video frame in the video frame sequence, to obtain the position information of the hand region of the current video frame and the gesture category; executing a corresponding control operation at least according to the position information of the hand region of the current video frame and/or the gesture category. Or, for example: obtaining a training sample image annotated with gesture information; scrambling the training sample image; and training the neural network based on a training sample set constituted by the training sample image and the scrambled training sample image. In such embodiments, the computer program may be downloaded and installed from a network through the communication element and/or installed from the removable medium 1311. When the computer program is executed by the processor, the functions defined in the method according to the embodiments of the present disclosure are executed.

In addition, the embodiments of the present disclosure provide a computer readable storage medium, which stores a computer instruction, where when the instruction is executed, an operation of each step in the gesture identification method according to any one of the embodiments above of the present disclosure is implemented, or an operation of each step in the gesture control method according to any one of the embodiments above of the present disclosure is implemented, or an operation of each step in the neural network training method according to any one of the embodiments above of the present disclosure is implemented.

In addition, the embodiments of the present disclosure further provide a computer program, including a computer readable code, where when the computer readable code is operated on a device, a processor in the device executes an instruction for implementing each step in the gesture identification method according to any one of the embodiments above of the present disclosure, or executes an instruction for implementing each step in the gesture control method according to any one of the embodiments above of the present disclosure, or executes an instruction for implementing each step in the neural network training method according to any one of the embodiments above of the present disclosure.

It should be noted that according to needs for implementation, the components/steps described in the embodiments of the present disclosure are separated into more components/steps, and two or more components/steps or some operations of the components/steps are also combined into new components/steps to achieve the purpose of the embodiments of the present disclosure.

The foregoing method according to the embodiments of the present disclosure may be implemented in hardware or firmware, or may be implemented as software or a computer code that can be stored in a recording medium (such as a CD ROM, a RAM, a floppy disk, a hard disk or a magneto-optical disk), or may be implemented as a computer code that is downloaded by means of a network, is originally stored in a remote recording medium or a non-transitory machine-readable medium, and will be stored in a local recording medium. Therefore, the method described herein may be processed by using software that is stored in a recording medium that uses a general-purpose computer, a special-purpose processor, or programmable or dedicated hardware (such as an ASIC or an FPGA). It may be understood that a computer, a processor, a microprocessor controller or programmable hardware includes a storage component (for example, a RAM, a ROM, or a flash memory) that can store or receive software or a computer code. When the software or the computer code is accessed and executed by the computer, the processor or the hardware, the processing method described herein is implemented. In addition, when the general-purpose computer accesses a code that is used for implementing processing shown herein, execution of the code converts the general-purpose computer to a special-purpose computer configured to execute the processing shown herein.

Persons of ordinary skill in the art may be aware that, in combination with the examples described in the embodiments disclosed in the specification, units and method steps may be implemented by electronic hardware or a combination of computer software and electronic hardware. Whether these functions are performed by hardware or software depends on the particular applications and design constraint conditions of the technical solutions. Persons skilled in the art may use different methods to implement the described functions for each particular application, but it should not be considered that this implementation goes beyond the scope of the embodiments of the present disclosure.

The implementations above are merely intended to describe the embodiments of the present disclosure rather than limit the embodiments of the present disclosure. Persons of ordinary skill in the art may make modifications and variations without departing from the spirit and scope of the embodiments of the present disclosure. Therefore, all equivalent technical solutions shall also fall within the scope of the embodiments of the present disclosure, and the patent protection scope of the embodiments of the present disclosure shall be subject to the claims.

The invention claimed is:

1. A gesture identification method, comprising:
    performing gesture information detection on an image by means of a neural network, to obtain a potential hand region, a potential gesture category and a potential gesture category probability in the image, the potential gesture category comprising a gesture-free category and at least one gesture category; and
    if the obtained potential gesture category with a maximum probability is the gesture-free category, not outputting position information of the potential hand region of the image; or otherwise, outputting the position information of the potential hand region of the image and the obtained potential gesture category with the maximum probability.

2. The method according to claim 1, wherein the neural network comprises a first neural network and a second neural network multiplexing a network input layer and a partial convolutional layer;
    the performing the gesture information detection on the image by means of the neural network, to obtain the potential hand region, the potential gesture category and the potential gesture category probability in the image comprises:
    detecting the potential hand region in the image by means of the first neural network; and
    detecting the potential gesture category and the potential gesture category probability in the image by means of the second neural network.

3. The method according to claim 1, wherein the at least one gesture category comprises: at least one predetermined gesture category; or
    the at least one gesture category comprises: at least one predetermined gesture category and other gesture categories.

4. The method according to claim 1, wherein the potential gesture category comprises: a first potential gesture category and a second potential gesture category; the first potential gesture category comprises: a gesture-contained category and a gesture-free category; and the second potential gesture category comprises: at least two predetermined gesture categories or at least one predetermined gesture category and other gesture categories; and
    the operation of if the obtained potential gesture category with the maximum probability is the gesture-free category, not outputting the position information of the potential hand region of the image; or otherwise, outputting the position information of the potential hand region of the image and the obtained potential gesture category with the maximum probability, comprises: if a detected first potential gesture category with a maximum probability is the gesture-free category, not outputting the position information of the potential hand region of the image; or otherwise, outputting the position information of the potential hand region of the image and a detected second potential gesture category with a maximum probability.

5. The method according to claim 4, wherein the second neural network comprises a first sub-neural network and a second sub-neural network multiplexing the network input layer and the partial convolutional layer;
    the performing the gesture information detection on the image by means of the neural network, to obtain the potential hand region, the potential gesture category and the potential gesture category probability in the image comprises:
    detecting the potential hand region in the image by means of the first neural network;
    detecting the first potential gesture category and the potential gesture category probability in the image by means of the first sub-neural network; and
    detecting the second potential gesture category and the potential gesture category probability in the image by means of the second sub-neural network.

6. The method according to claim 1, wherein prior to the performing the gesture information detection on the image by means of the neural network, the method further comprises:
    if the potential gesture category with the maximum probability obtained by detecting a previous video frame of a current video frame is not the gesture-free category, cutting a local region of the current video frame at least according to the position information of the potential hand region output by the previous video frame, the cut local region being an image input into the neural network.

7. The method according to claim 6, wherein the cutting the local region of the current video frame at least according to the position information of the potential hand region output by the previous video frame, the cut local region being the image input into the neural network, comprises:
    enlarging the potential hand region output by the previous video frame based on the position information; and
    cutting the local region of the current video frame according to the enlarged potential hand region, the cut local region being the image input into the neural network; or
    wherein the cutting the local region of the current video frame at least according to the position information of the potential hand region output by the previous video frame, the cut local region being the image input into the neural network, comprises:
    enlarging the potential hand region output by the previous video frame based on the position information;
    respectively offsetting the enlarged potential hand region a predetermined distance with respect to different directions of the position information and respectively cutting; and
    respectively performing gesture information detection on a plurality of cut potential hand regions and determining a potential hand region with a minimum probability that the potential gesture category is the gesture-free category as the image input into the neural network.

8. The method according to claim 6, wherein prior to the performing the gesture information detection on the image by means of the neural network when the current video frame is an initialization detection frame, the method further comprises:

determining a plurality of initial potential hand regions respectively corresponding to a plurality of predetermined initialization detection boxes in the initialization detection frame; and respectively performing gesture information detection on the plurality of initial potential hand regions and cutting an initial potential hand region with a minimum probability that the potential gesture category is the gesture-free category as the image input into the neural network;

wherein the initialization detection frame is a first video frame in a video frame sequence, or the potential gesture category with the maximum probability obtained by detecting the previous video frame of the initialization detection frame is the gesture-free category.

9. The method according to claim 8, wherein the plurality of predetermined initialization detection boxes comprises: a plurality of predetermined initialization detection boxes at different positions, at least two of the initialization detection boxes having same or different sizes.

10. The method according to claim 1, wherein prior to the performing the gesture information detection on the image by means of the neural network, the method further comprises:

obtaining a training sample image annotated with gesture information;

scrambling the training sample image; and training the neural network based on a training sample set constituted by the training sample image and the scrambled training sample image.

11. The method according to claim 10, wherein the training the neural network based on the training sample set constituted by the training sample image and the scrambled training sample image comprises:

training the first neural network based on a positive sample in the training sample set; and after training the first neural network is completed, fixing a network parameter of the multiplexed network input layer and partial convolutional layer and training the second neural network based on the positive sample and a negative sample in the training sample set.

12. The method according to claim 10, wherein the training the neural network based on the training sample set constituted by the training sample image and the scrambled training sample image comprises:

training the first neural network based on a positive sample in the training sample set; and after training the first neural network is completed, fixing a network parameter of the multiplexed network input layer and partial convolutional layer and training the first sub-neural network and the second sub-neural network based on the positive sample and a negative sample in the training sample set.

13. The method according to claim 10, wherein the scrambling comprises any one or more of: translation processing, scaling processing, and mirroring processing.

14. The method according to claim 1, wherein the at least one gesture category comprises any one or more of: a flat propping hand, thumbs-up, a pistol hand, an OK hand, a peach heart hand, a V-shaped hand, and a five-finger splaying hand.

15. A gesture control method, comprising:

performing gesture identification on a current video frame in a video frame sequence using the method according to claim 1, to obtain position information of a hand region of the current video frame and a gesture category; and executing a corresponding control operation at least according to the position information of the hand region of the current video frame and/or the gesture category.

16. The method according to claim 15, wherein the executing the corresponding control operation at least according to the position information of the hand region of the current video frame and/or the gesture category comprises:

determining change information between the position information of the hand region of the current video frame and/or the gesture category and position information of a hand region of at least one earlier and continuous video frame and/or a gesture category; and executing a corresponding control operation according to the change information.

17. The method according to claim 16, wherein the executing the corresponding control operation according to the change information comprises:

switching from a control operation corresponding to a gesture category of a previous video frame to the control operation corresponding to the gesture category of the current video frame in response to that the change information represents the gesture category of the current video frame is different from the gesture category of the previous video frame.

18. The method according to claim 16, wherein the executing the corresponding control operation according to the change information comprises:

executing an object moving operation corresponding to a position information change in response to that the change information represents the position information of the hand region of the current video frame is different from position information of a hand region of the previous video frame.

19. A gesture identification apparatus, comprising:
a memory storing processor-executable instructions; and
a processor arranged to execute the stored processor-executable instructions to perform:

performing gesture information detection on an image by means of a neural network, to obtain a potential hand region, a potential gesture category and a potential gesture category probability in the image, the potential gesture category comprising a gesture-free category and at least one gesture category; and if the obtained potential gesture category with the maximum probability is the gesture-free category, not outputting position information of the potential hand region of the image; or otherwise, outputting the position information of the potential hand region of the image and the obtained potential gesture category with the maximum probability.

20. A non-transitory computer readable storage medium having stored thereon computer-readable instructions that, when executed by the processor, cause the processor to implement a gesture identification method, the method comprising:

performing gesture information detection on an image by means of a neural network, to obtain a potential hand region, a potential gesture category and a potential gesture category probability in the image, the potential gesture category comprising a gesture-free category and at least one gesture category; and if the obtained potential gesture category with a maximum probability is the gesture-free category, not outputting position information of the potential hand region of the image; or otherwise, outputting the position information of the potential hand region of the image and the obtained potential gesture category with the maximum probability.

* * * * *